J. ROWE.
TRACTION AND ANTISKID DEVICE.
APPLICATION FILED SEPT. 23, 1920.
1,420,149.
Patented June 20, 1922.
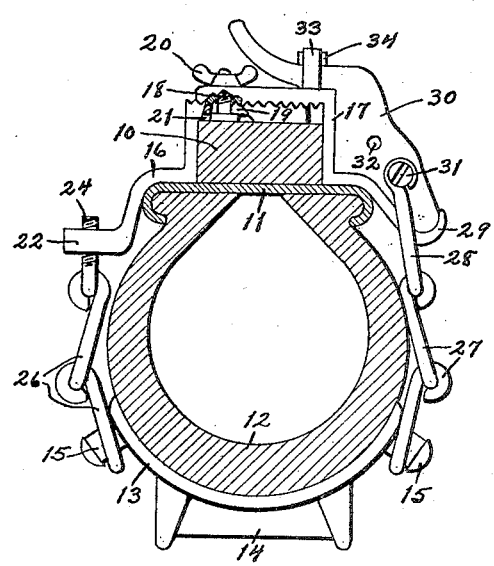
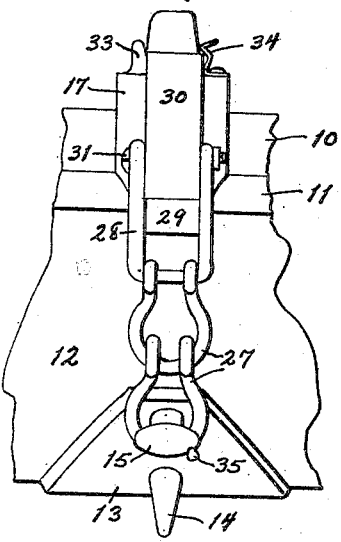
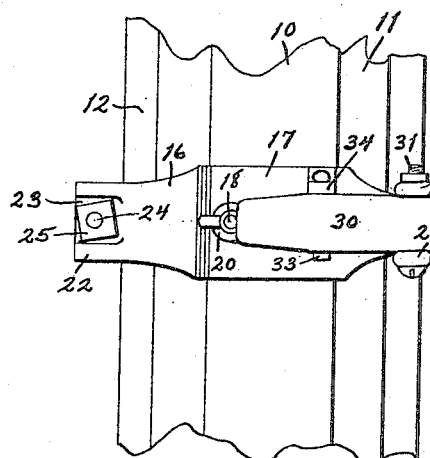
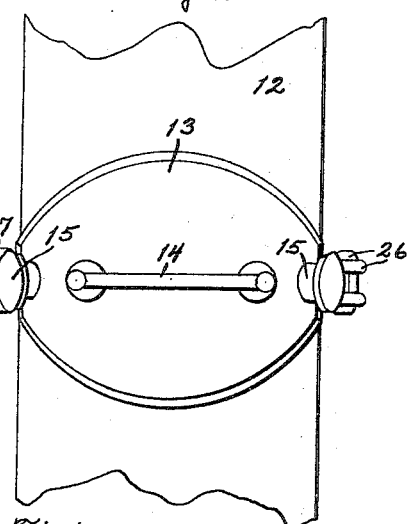
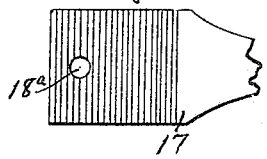
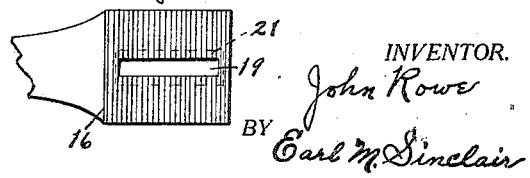
INVENTOR.
John Rowe
BY Earl M. Sinclair
ATTORNEY.

UNITED STATES PATENT OFFICE.

JOHN ROWE, OF CASEY, IOWA.

TRACTION AND ANTISKID DEVICE.

1,420,149.    Specification of Letters Patent.    Patented June 20, 1922.

Application filed September 23, 1920. Serial No. 412,269.

*To all whom it may concern:*

Be it known that I, JOHN ROWE, a citizen of the United States of America, and resident of Casey, Guthrie County, Iowa, have invented a new and useful Traction and Antiskid Device, of which the following is a specification.

The object of this invention is to provide an improved construction for traction and anti-skid attachments for automobile tires, and especially in the manner of quickly and easily removing and replacing such attachments.

A further object of this invention is to provide an adjustable fastening means for a mud lug adapting it for use on different wheel rims.

With these and other objects in view, my invention consists in the construction, arrangement and combination of elements hereinafter set forth, pointed out in my claims and illustrated by the accompanying drawing, in which—

Figure 1 is a cross-section through the felloe, rim and tire of an automobile wheel, illustrating my improved attachment in place thereon. Figure 2 is a side elevation of the same devices. Figure 3 is a bottom plan of the device, showing the felloe of the wheel to which it is attached. Figure 4 is a top plan of the device, showing a portion of the tire on which it is mounted. Figures 5 and 6 are views of the contacting portions of the felloe plates.

In the construction and mounting of the device as shown the numeral 10 designates the felloe, 11 the rim and 12 the tire of a vehicle wheel, such members being shown conventionally. The attachment consists of a mud lug or shoe 13, which may be of any suitable size and construction, preferably embodying a transverse rib or lug 14 and headed studs 15 at its ends, to receive the attaching devices. It should be noted this traction and anti-skid device is of the unitary type, each adapted to be attached independently to the wheel to the desired number, and not connected in series around the wheel. The numerals 16, 17 designate coacting plates or bars adapted to extend across the radially inner side of the felloe 10 and exposed portion of the rim 11, said plates being shaped to conform to said felloe and rim. The plate 16 has a straight portion extending across and in contact with the radially inner surface of the felloe 10 and the plate 17 has a similar portion overlapping the straight portion of the plate 16. Each plate is then bent at right angles at the outer end of its straight portion, and engages the lateral side of the felloe, thence curves outwardly around the rim and toward the tire 12. The straight portions of the plates 16, 17 are adjustably connected by a bolt 18 passing through a hole in the plate 17 and a longitudinal slot 19 in the plate 16 and secured as by a wing nut 20. The bolt 18 is formed with a square head next to the felloe 10 and received in a countersunk groove 21 in the plate 16. The adjacent and contacting faces of the straight parts of the plates 16, 17 preferably are notched or toothed for mutual interengagement, to prevent slipping of said members in use and permit of a more rigid union through the bolt 18. Through this adjustment the plates 16, 17 may be caused to engage and fit snugly to the felloe and the rim.

The end of the plate 16 nearest the tire of the wheel is directed outwardly as a lug or arm 22 which is apertured and also formed with an angular seat 23 on that face directed toward the center of the wheel. An eyebolt 24 is mounted through the aperture of the arm 22 and has its nut 25 located in the seat 23. The eye of the bolt 24 is pivotally engaged by one of several links 26 suitably connected and extending around one lateral side of the tire 12 and connected in turn to the headed stud 15 at one end of the mud shoe 13. The heads of the studs 15 preferably are elongated slightly in the direction of the circumference of the wheel to prevent ready disengagement of the connecting links. Similar links 27 are provided extending around the other lateral side of the tire 12 and engaging the other stud 15 of the mud shoe and also engaging a clevis 28 adapted to embrace the end of the plate 17 at times. The adjacent end of the plate 17 is curved to form a hooked seat 29 opening toward the center of the wheel and a lever 30 is formed with a nose adapted to engage in said seat. The open end of the clevis 28 is pivoted by a bolt or pin 31 to the lever 30 between its ends, said bolt or pin passing through one of a number of holes 32 in said lever. The lever 30 is shaped in a general way to conform to the shape of the plate 17 and is adapted to be received at its free end between a stud 33 and spring 34 carried by the straight portion of said plate, whereby said lever is held in closed or latching position.

The device is especially valuable for emergency use to enable the wheels of a motor vehicle to extricate themselves from a mud hole or the like, where sufficient traction cannot be secured. To apply the device to a wheel the plates 16, 17 are first adjusted to fit the felloe and rim thereof, through manipulation and adjustment of the bolt 18 in the slot 19. Then the combined plates are placed in position around the felloe and rim and the mud shoe is placed in position over the tread portion of the tire 12. The nose of the lever 30 is positioned in the concaved seat 29 of the plate 17 and the lever is swung inwardly toward the wheel, the nose serving as a pivot. This operation tightens the device around the wheel and tire, and the lever engages between and is held by the stud 33 and spring 34, although the tendency is for it to remain in this position, having passed beyond the line intersecting the pivot and fulcrum. The connecting devices at one side of the tire may be adjusted by means of the eye-bolt 24 and nut 25 threaded thereon, and on the opposite side by selective positioning of the pin or bolt 31 in the holes 32 of the lever, so that the device is fitted in length to the size of the tire on which it is to be used. Engagement of the nut 25 in the angular seat 23 prevents accidently disarrangement of the adjustment of the nut on the eye-bolt.

If desired metal tongues or fingers such as 35, one of which is shown in Figure 2, may be formed on the mud shoe 13 adjacent the headed studs 15, to assist in preventing accidental removal of the links 26 or 27 therefrom. These tongues or fingers preferably would be spaced slightly from the headed studs but might be hammered or otherwise bent toward said studs after the links are in place.

I do not desire to be understood as limiting myself to the precise construction and arrangement of parts herein shown and described, as various modifications, within the scope of the appended claims, may be employed without departing from the spirit of my invention.

I claim as my invention—

1. In a device of the class described, a pair of felloe plates each having a lateral portion adapted to engage the side of a felloe, each of said felloe plates being bent substantially at right angles between its ends to form transverse portions, said transverse portions adapted to overlap each other and together extend transversely across the radially inner face of the felloe, one of said plates being formed with a hole and the other being formed with a longitudinal slot, and a bolt extending through said hole and slot and adapted to secure said plates together in such manner that their lateral portions will substantially engage the opposite sides of the felloe, the contacting faces of the transverse portions of said plates being serrated for interengagement with each other.

2. In a device of the class described, a pair of felloe plates each having a lateral portion adapted to engage the side of a felloe, each of said plates being bent substantially at right angles between its ends to form transverse portions, said transverse portions being adapted to overlap each other and together span the radially inner face of the felloe, the contacting faces of said portions being serrated or toothed, one of said plates being formed with a hole in its transverse portion and the other being formed with a longitudinal slot, the last named plate also being formed with a countersink groove coextensive with said slot, and a bolt extending through said hole and slot, said bolt being formed with an angular head received within said groove and held thereby against rotation, together with a securing member threaded on the outer end of said bolt.

Signed at Casey, in the county of Guthrie and State of Iowa, this 10th day of September, 1920.

JOHN ROWE.